United States Patent Office 3,445,289
Patented May 20, 1969

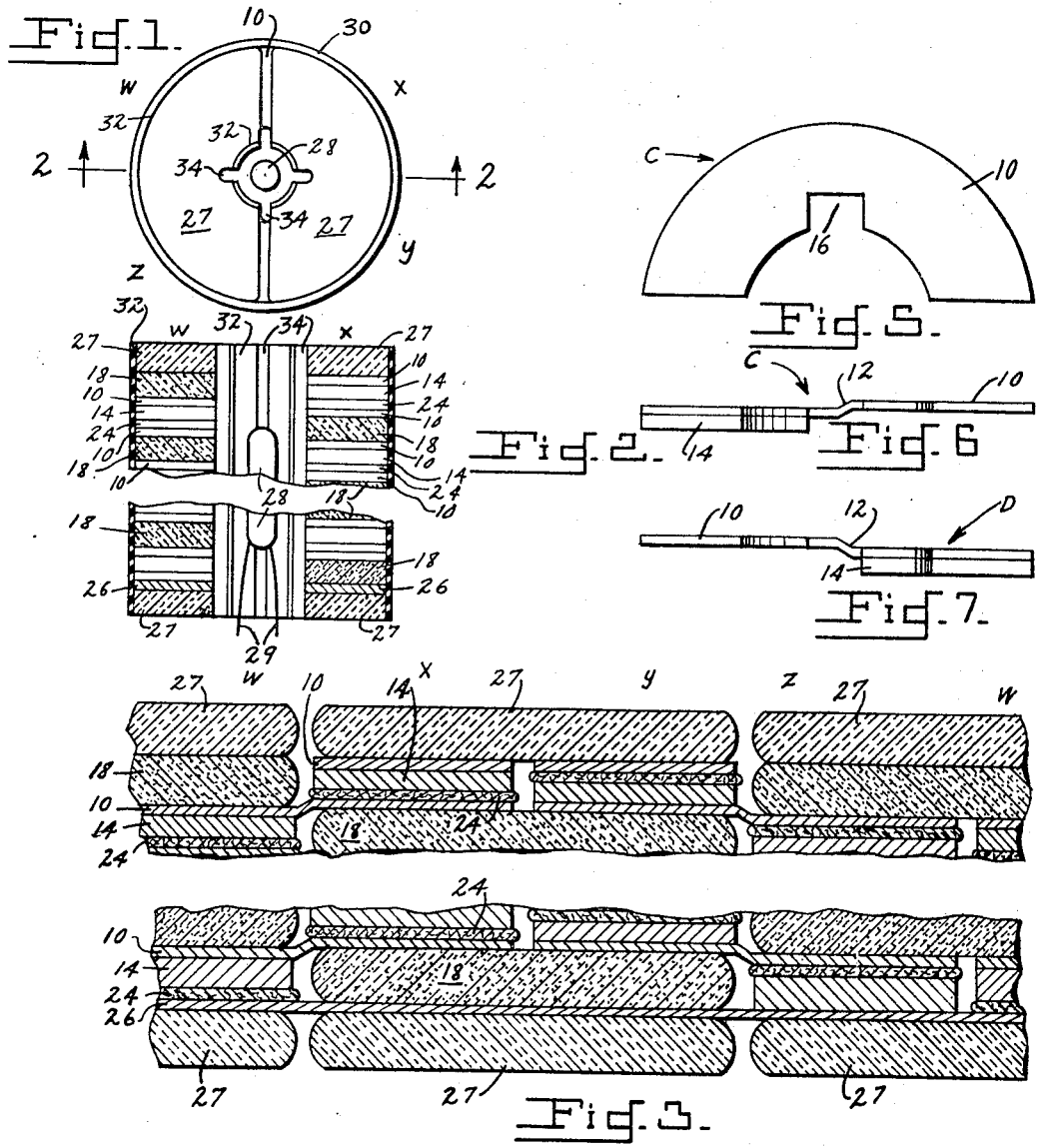

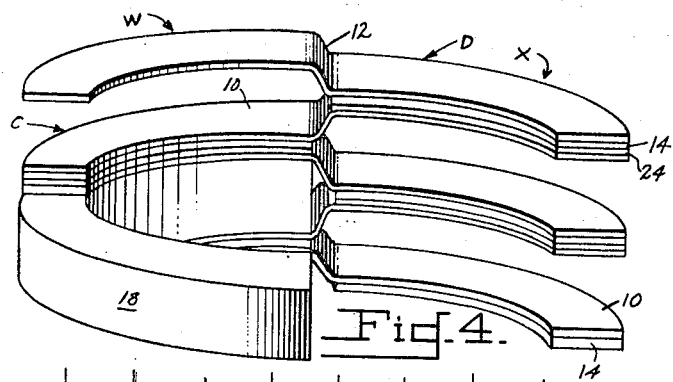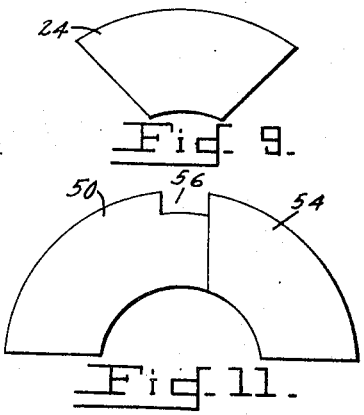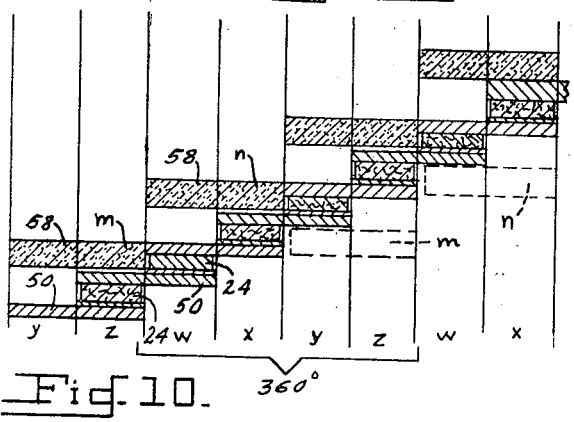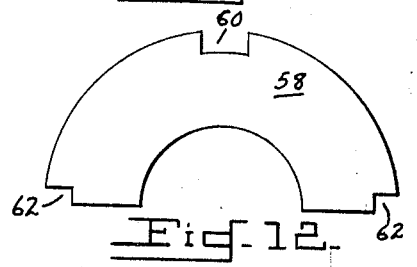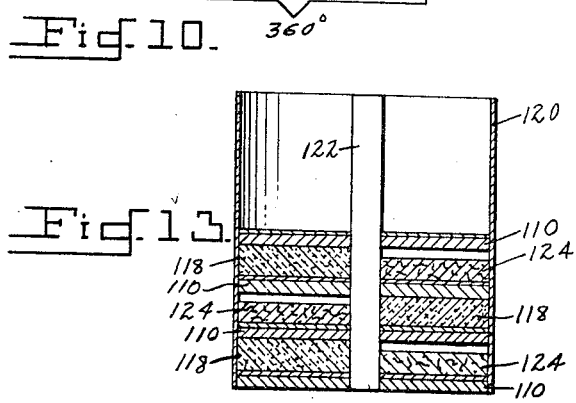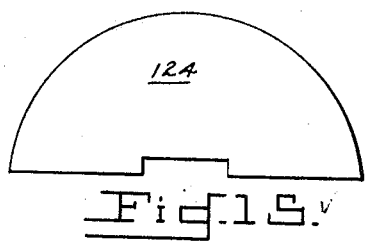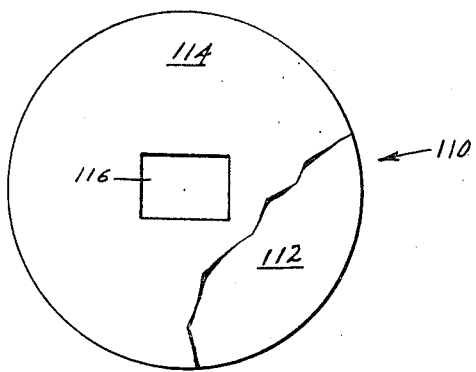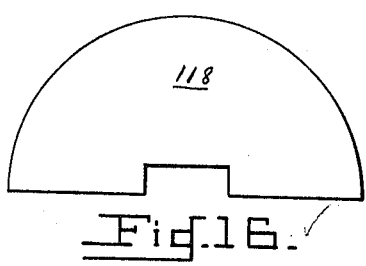

3,445,289
BATTERY
Henry Norman Nerwin, Jr., Chicago, Ill., Willard S. Leadbeter, Lanham, Md., and John S. Hilten, Arlington, Va., assignors to the United States of America as represented by the Secretary of the Army
Filed June 27, 1956, Ser. No. 594,336
Int. Cl. H01m *17/06*
U.S. Cl. 136—83     1 Claim The invention described herein may be manufactured and used by or for the Government for governmental purposes without the payment to us of any royalty thereon.

This invention relates to thermal batteries of the type that are sometimes used to provide electrical energy for electronic ordnance fuzes.

Such thermal batteries have an electrolyte that is solid and inactive at normal temperatures. Thermite or similar heating material is provided in proximity to the electrolyte. Even after long storage, such batteries may be quickly activated by igniting the heating material and thus melting the electrolyte.

The invention provides bimetal elements one side of which is one electrode for one cell and the other side of which is the other electrode for another cell. The particular mechanical shape and relationship of parts results in a compact multi-cell thermal battery of improved, low-cost construction.

A principal object of the invention is to provide an improved, compact, low-cost construction for multi-cell thermal batteries.

Another object of this invention is to provide a simple arrangement of thermal battery elements that is adapted to machine assembly.

A further object is a thermal battery construction wherein all the elements are simple and easy to fabricate.

Another object is to provide a battery structure that will withstand the shock of rough handling and firing in an ordnance device.

Further objects, aspects, uses and advantages of the invention will become apparent from the following description and the accompanying drawings, in which:

FIG. 1 is a top view of a first form of a battery in accordance with this invention.

FIG. 2 is a sectional view taken along lines 2—2 of FIG. 1.

FIG. 3 is a developed representation showing the relationship of the parts of the form of FIG. 1.

FIG. 4 is a perspective view of four cells of the first form of the battery.

FIG. 5 is a plan view of a bimetallic semi-washer component.

FIG. 6 is a side elevation of the bimetallic semi-washer component C.

FIG. 7 is a side elevation of the bimetallic semi-washer component D.

FIG. 8 is a plan view of a heat pad.

FIG. 9 is a plan view of an electrolyte element.

FIG. 10 is a schematic showing of a modified form of the battery.

FIG. 11 is a plan view of the bimetal plate used in the modification of FIG. 10.

FIG. 12 is a plan view of the heat pad used in the modification of FIG. 10.

FIG. 13 is a longitudinal sectional view of another modification.

FIG. 14 is a plan view of the bimetal plate used in the modification of FIG. 13.

FIG. 15 is a plan view of the electrolyte element used in the modification of FIG. 13.

FIG. 16 is a plan view of the heat pad of the modification of FIG. 13.

FIGS. 1–9 relate to a first form of battery in accordance with the invention. The battery is made up of four basic elements shown in FIGS. 5–9. FIGS. 5 and 6 show a bimetallic semi-washer C which is composed of a nickel plate 10, offset in the center at 12 and having a quadrant of calcium plate 14 welded to one side. There is a notch 16 for use in assembly. Semi-washer D (FIG. 7) is similar in construction except it is left-handed with respect to semi-washer C. These semi-washers are not truly semi-circular in shape, lacking width at the diameter.

Heat pad 18 is illustrated in FIG. 8 and consists of a mixture of asbestos and a combustible material as is known in the thermal battery art. It is a semi-washer of true semi-circular shape and has notch 20 in the center and two side notches 22 as shown. FIG. 9 shows the electrolyte element 24 which as can be seen is not a true quadrant, having material removed from each side. It is identical in plan to the calcium plate 14. The electrolyte element 24 is composed of materials well known in the thermal battery art.

As can be seen all the parts are of simple shape and can readily be stamped or punched from sheet material. The only subsequent treatment required is the welding of the calcium quadrant 14 to the nickel plate 10.

The assembled battery is in the form of a cylinder, with four quadrants designated as $w$, $x$, $y$, and $z$ in FIGS. 1, 2, 3, and 4. A half of the cylinder, containing quadrants $w$ and $x$, forms one series of cells, and the other half, containing quadrants $y$ and $z$, forms another series. As shown in FIGS. 3 and 4, the battery is stacked so that in each half the electrical series is as follows: a nickel plate 10; a calcium plate 14 electrically connected to the nickel plate; electrolyte 24; nickel plate 10; calcium 14; electrolyte 24; nickel 10; etc. The physical series in each quadrant is as follows: half bimetal element C, electrolyte 24, half bimetal element D, half heat pad 18, half bimetal element C, electrolyte 24, etc.

The battery is assembled by simply stacking the various elements to build up the battery. At the top and bottom are insulating pads 27: At the bottom of the stack a full washer 26 of nickel is used to connect the halves in electrical series. Other than this the only tie between the halves are the heat pads 18. After stacking, the battery is coated with a silicone rubber 32, such as Dow Corning's "Silastic DC 2007" (FIG. 1). This holds it together mechanically, insulates it electrically and thermally, and prevents the liquid electrolyte 24 from leaking from one cell to the next. When primer 28 fires (FIGS. 1 and 2), it ignites heat pads 18 through slots 34 which are formed in that portion of the coating around the interior of cylindrical cavity 30. Primer 28 is supported by leads 29. The unit is enclosed in metal (not shown) for additional mechanical strength.

The modification shown schematically in FIG. 10 is helically stacked. It is made up from the three components shown in FIGS. 9, 11 and 12. Nickel semi-washer 50 has a calcium quadrant 54 plated on it (FIG. 11). In production this plating is done before the parts are stamped from a sheet. It has a notch 56 for assembly. The same shape electrolyte 24 (FIG. 9) is used as was used in the first form. The heat pad 58 (FIG. 12) is similar to heat pad 18 (FIG. 8) except the notches 60 and 62 are in the outer edge. The elements are stacked helically, yet they are in the same electrical and physical sequence as described before.

As can be seen from FIG. 10, the same heat pad $m$ that is above one cell in each quadrant $y$ and $z$ is below another cell in the next revolution of the helix. Likewise, heat pad $n$ in quadrants $w$ and $x$ is above the cells in one revolution of the helix and below them in the next. There is no off-set in the elements, they being sufficiently flexible to accommodate themselves to the stack.

Another modification is shown in FIGS. 13, 14, 15, and 16. In it the bimetallic plate 110 is washer shaped with the entire surface of the nickel base 112 on one side covered with calcium 114. The calcium on half that surface is not needed; it is present only to simplify manufacture. The center hole 116 is rectangular in shape to both contain the primer (not shown in these views) and to position the parts during assembly. The electrolyte 124 is a semi-washer as is the heat pad 118. To assemble the battery a bimetal washer 110 is first placed in case 120, around removable centering post 122. Then the electrolyte 124 is placed on one half the plate 110 and the heat pad 118 on the other half. The post 122 is then rotated half a revolution and another bimetal washer, electrolyte, and heat pad are added to the stack. By rotating the post 122 each time the parts are always added from the same orientation.

It will be apparent that the embodiments shown are only exemplary and that various modifications can be made in construction and arrangement within the scope of the invention as defined in the appended claim.

We claim:
1. A thermal battery comprising in combination: a first plurality of bimetal semi-washers composed of a first metal and having a quadrant surface covered with a second metal of different electrothermal characteristics, each of said first semi-washers being offset in the center; a second plurality of bimetallic semi-washers having the same construction as said first semi-washers except that said second semi-washers are left-handed with respect to said first semi-washers; a plurality of semi-washer heat pads made up of a mixture of asbestos and a combustible material; a plurality of quadrant electrolyte elements; said first and second semi-washers being stacked with said electrolyte elements and said semi-washer heat pads so as to form a cylinder having two halves, a first half of the cylinder containing first and second quadrants and forming a first series of cells which alternate between said first and second quadrants, and a second half of the cylinder containing third and fourth quadrants and forming a second series of cells which alternate between said third and fourth quadrants, each cell being made up of a quadrant electrolyte element placed between a quadrant of first metal and a quadrant of second metal, said semi-washer heat pads being placed between opposite first metal surfaces of said semi-washers so as to be alternately stacked with said cells; means for connecting said first and second series of cells in series; primer means placed within the cylindrical tube formed in the center of said cylinder by said semi-washers, said primer igniting said heat pads when said primer is fired; means for firing said primer; and silicon rubber means coating said cylinder to hold said cylinder together, insulate said cells, and prevent said electrolyte from leaking.

References Cited

UNITED STATES PATENTS

| 2,631,180 | 3/1953 | Robinson | 136—83 |
| 2,707,199 | 4/1955 | Ruben | 136—83 |
| 2,762,858 | 9/1956 | Wood | 136—103 |

OTHER REFERENCES

Goodrich et al., "Journal of Electrochem. Society," vol. 99, No. 8, pp. 207c, 208c, August 1952.

BENJAMIN R. PADGETT, *Primary Examiner.*

M. J. McGREAL, *Assistant Examiner.*

U.S. Cl. X.R.

136—90